United States Patent
Resio et al.

(10) Patent No.: US 11,174,831 B2
(45) Date of Patent: Nov. 16, 2021

(54) COMPLIANT, SCALABLE SYSTEMS FOR CAPTURING WAVE ENERGY IN TWO MODES OF WAVE MOTIONS

(71) Applicants: Donald Thomas Resio, Ponte Vedra, FL (US); Abdallah Walid Mohamed Kamal El Safty, Jacksonville, FL (US); Michelle Ann Vieira, Atlantic Beach, FL (US); Ashley Norton, Asheville, NC (US); Brian Thomas Kopp, Jacksonville, FL (US); William R. Dally, Ponte Vedra Beach, FL (US)

(72) Inventors: Donald Thomas Resio, Ponte Vedra, FL (US); Abdallah Walid Mohamed Kamal El Safty, Jacksonville, FL (US); Michelle Ann Vieira, Atlantic Beach, FL (US); Ashley Norton, Asheville, NC (US); Brian Thomas Kopp, Jacksonville, FL (US); William R. Dally, Ponte Vedra Beach, FL (US)

(73) Assignee: University of North Florida Board of Trustees, Jacksonville, FL (US)

( * ) Notice: Subject to any disclaimer, the term of this patent is extended or adjusted under 35 U.S.C. 154(b) by 0 days.

(21) Appl. No.: 16/948,736

(22) Filed: Sep. 30, 2020

(65) Prior Publication Data
US 2021/0010450 A1 Jan. 14, 2021

Related U.S. Application Data

(63) Continuation of application No. PCT/US2019/025597, filed on Apr. 3, 2019.
(Continued)

(51) Int. Cl.
*F03B 13/18* (2006.01)
*F03B 13/10* (2006.01)

(52) U.S. Cl.
CPC ............ *F03B 13/188* (2013.01); *F03B 13/10* (2013.01); *F03B 13/1885* (2013.01)

(58) Field of Classification Search
CPC .... F03B 13/188; F03B 13/10; F03B 13/1885; F03B 13/18; F03B 13/16; F03B 13/14;
(Continued)

(56) References Cited

U.S. PATENT DOCUMENTS 8,581,432 B2 * 11/2013 Rohrer ................ F03B 13/1815
290/53
10,273,931 B2 * 4/2019 Ohlsson .................. F03B 13/20
(Continued)

OTHER PUBLICATIONS

International Search Report and Written Opinion for PCT/US19/25597 (filing date: Apr. 3, 2019) dated Jun. 24, 2019; Applicant: University of North Florida Board of Trustees.
(Continued)

*Primary Examiner* — Hoang M Nguyen
(74) *Attorney, Agent, or Firm* — Smith & Hopen, P.A.; Paul Murty

(57) ABSTRACT

A wave energy collection and conversion system that uses a compliant capture mechanism to enable the collection of wave energy over extensive distances without introducing damaging forces onto the collection structure. The system includes a flexible membrane in contact with or submerged under water, a plurality of power generation devices positioned on a sea floor, and lines that connect the flexible membrane to the power generation devices. The power generation devices each include a self-reeling mechanism and a turbine. As wave energy pushes the flexible membrane, the lines are reeled into and out of the corresponding power generation device(s). Rotation of the shaft, in turn, rotates a gear and rotator of the turbine, thus harnessing energy derived from the wave motion.

19 Claims, 8 Drawing Sheets

Related U.S. Application Data

(60) Provisional application No. 62/652,028, filed on Apr. 3, 2018.

(58) Field of Classification Search
CPC . Y02E 10/20; Y02E 10/30; F05B 2240/9172; E02B 9/08
USPC .................. 60/398, 495, 497, 499, 504–506
See application file for complete search history.

(56) References Cited

U.S. PATENT DOCUMENTS

| | | |
|---|---|---|
| 2008/0129052 A1 | 6/2008 | Rourke |
| 2010/0295302 A1 | 11/2010 | Martin |
| 2011/0308244 A1* | 12/2011 | Findlay .................. F03B 13/16 60/500 |
| 2012/0032446 A1* | 2/2012 | Rohrer .................. F03B 13/188 290/53 |
| 2012/0267894 A1 | 10/2012 | Torvestad |
| 2016/0131101 A1* | 5/2016 | Bein .................. F03B 13/1885 290/42 |
| 2016/0319798 A1 | 11/2016 | Blodgett et al. |
| 2017/0292493 A1 | 10/2017 | Bein |

OTHER PUBLICATIONS

International Preliminary Report on Patentability for PCT/US19/25597 (filing date: Apr. 3, 2019) dated Oct. 6, 2020; Applicant: University of North Florida Board of Trustees.

* cited by examiner

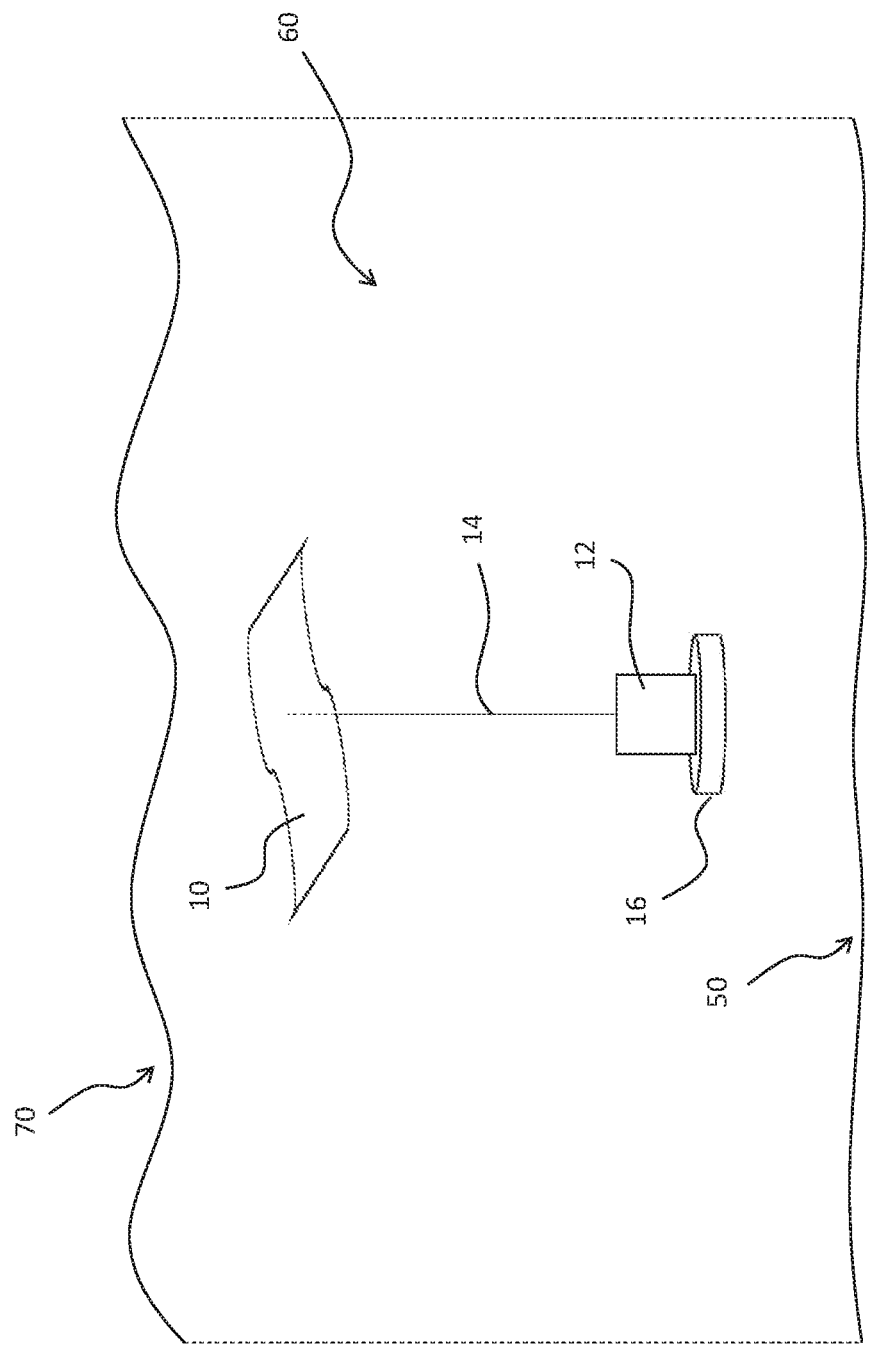

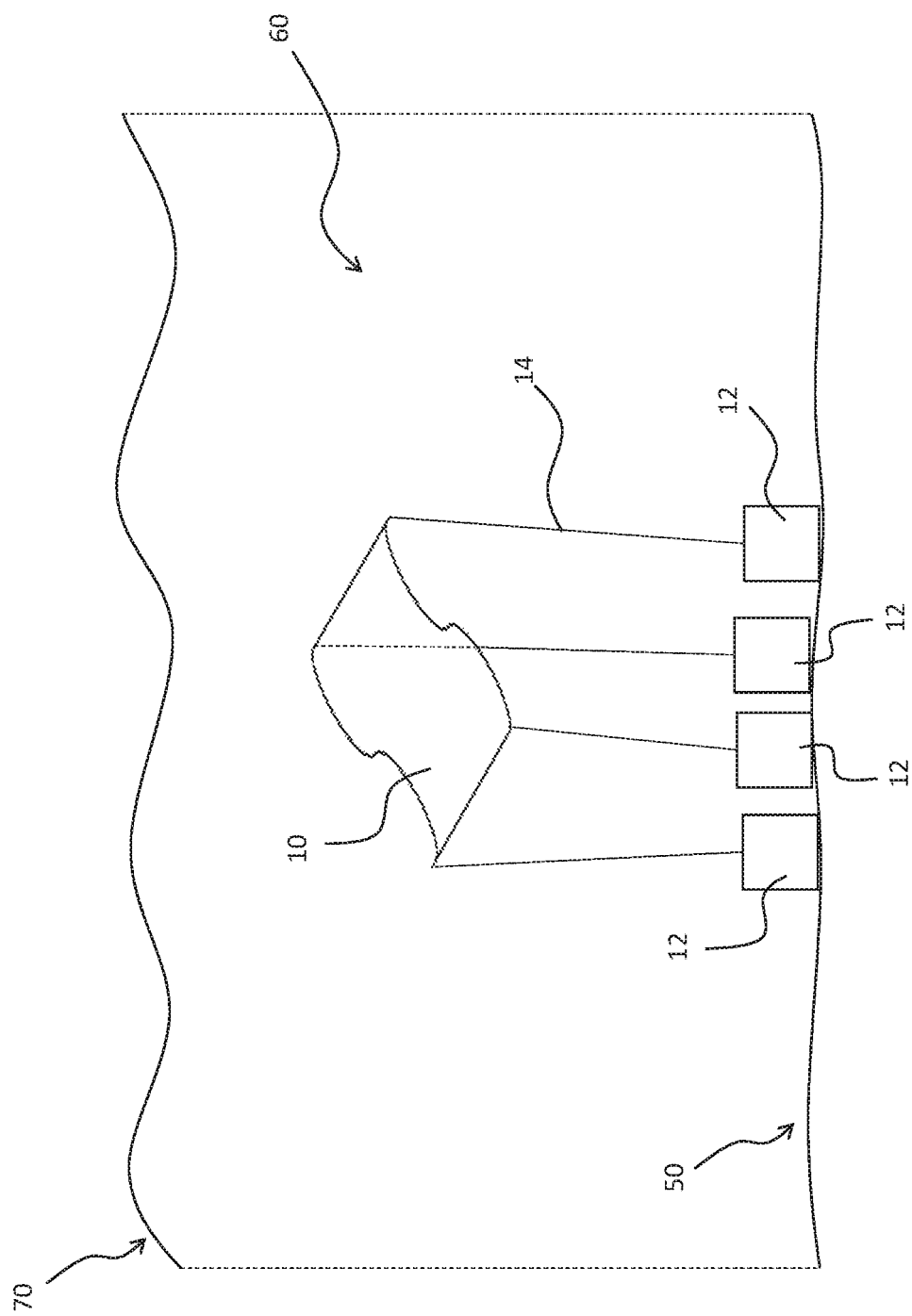

COMPLIANT, SCALABLE SYSTEMS FOR CAPTURING WAVE ENERGY IN TWO MODES OF WAVE MOTIONS

CROSS-REFERENCE TO RELATED APPLICATIONS

This non-provisional application is a continuation of and claim priority to international application No. PCT/US2019/025597, entitled "Compliant, scalable systems for capturing wave energy in two modes of wave motions," filed Apr. 3, 2019 by the same inventors, which is a continuation of and claims priority to provisional application No. 62/652,028, entitled "Compliant, scalable system for capturing wave energy in two modes of wave motion," filed Apr. 3, 2018 by the same inventors.

BACKGROUND OF THE INVENTION

1. Field of the Invention

This invention relates, generally, to wave energy. More specifically, it relates to a wave energy harnessing/conversion system for winds with periods in the range of wind-waves.

2. Brief Description of the Prior Art

Wind waves represent one of the densest sources of energy on the planet. FIG. 1 shows the power generation potential as a function of wave height and wave period over one meter of crest length (the direction perpendicular to the direction of propagation). As can be seen, even relatively average oceanic wave conditions (a 2-meter wave height with a period of 10 seconds) produces an energy flux of about 15 kilowatts (KW) across a 1-meter width. On the other hand, the power (energy flux) in wind passing through a square meter area orthogonal to the wind direction (essentially oriented to be perpendicular to the wind direction in the vertical), shown as a function of wind speed in FIG. 2, for a relatively strong average wind speed wind speed (12 m/sec) produces only 0.8 Kw per square meter. It should be noted, however, that this is not a true measure of the wind power accessed by commercial-scale wind energy systems today, since these devices typically cover areas that are much larger than 1 square meter (typically in the range of 1000-8000 $m^2$ area). It should also be noted that in many areas of the world, the available average wind speed is considerably less than 12 m/sec. Another potential advantage of wave power devices is that they can generate power up to 90% of the time, whereas wind and solar power devices only generate power about 20-30% of the total time.

A major drawback of conventional wave energy conversion (WEC) devices has been that as the length of the energy collection device along the wave front increases the forces on the structure become significantly larger. This has resulted in WEC designs that are quite fragile with respect to large wave heights occurring in typical sites in ocean storms. For example, the PELAMAS WEC device deployed off of Portugal has now been removed from its offshore mooring due to mechanical problems. Similarly, WEC devices deployed nearshore have resulted a series of terminated tests due mechanical failures related to wave forces in deployments. Thus, the conundrum in WEC devices has been that the natural high energy density in waves has limited the size of energy harvesting systems due to wave-generated forces acting on the system and the large cost of elaborate energy capture devices. The fundamental problem in this conundrum is overcome here by the current invention, specifically the use of compliant energy-harvesting components to interface with the waves, as will be discussed further as this specification continues.

Another WEC device, WAVEPISTON, utilizes a piston-type mechanism to harness the horizontal component wave energy, that relies on horizontal motions of a heavy steel plate to force water though a pipe to an onshore site where the energy is harvested using convectional hydropower methods. The type of structure requires very large waves to produce harvestable energy and cannot be effectively scaled for various applications in the manner of the system described below. It is also limited to the areal extent of its collection area due to the effect of accumulating moments on the structure.

Accordingly, what is needed is an improved wave energy conversion system that addresses the difficulties found in conventional systems. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a compliant, scalable wave energy conversion system is now met by a new, useful, and nonobvious invention.

The novel wave energy harnessing and conversion system includes a flexible membrane and a plurality of power generation systems. Each of the flexible membrane and the plurality of power generation systems (or turbines) is adapted to be disposed within an amount of water and secured to each other via one or more intermediary cables, with a first end of each intermediary cable being secured to the flexible membrane, and a second end of each intermediary cable being secured to one of the plurality of power generation systems. The membrane may be formed of a strong fabric that is resistant to tearing. In addition, the membrane may include a skeleton of flexible tubing to ensure that the flexible membrane retains its approximate overall form. In an embodiment, a flotation component is coupled to at least one edge of the flexible membrane (such as a top edge of the flexible membrane), the floatation component having an associated density less than a density of water, such that the flotation component is adapted to be disposed at or near the surface of the water.

Each power generation system includes a self-reeling line handling component that removes any slack of the corresponding line during a portion of the wave cycle in which motion is directed toward a corresponding power generation system; a reel that spins a shaft when a wave pulls the corresponding lines to or from the corresponding power generation system; and a gear coupled to the shaft that turns a rotator within a generator, thus harnessing wave energy. Energy is collected when the wave pulls the flexible membrane to one or more corresponding power generation systems, with each power generation system being prepared to harness energy from the wave motions.

In an embodiment, the flexible membrane is vertically disposed to engage a horizontal component of the wave energy. In this embodiment, the plurality of power generation systems may further include a first set of power generation system disposed on a first side of the flexible membrane, and a second set of power generation systems disposed on a second side of the flexible membrane. As such, a horizontal translation of the flexible membrane in a direction toward the first set of power generation systems actuates the self-reeling line handling components of the first set of power generation systems. In another embodiment, the flexible membrane is horizontally disposed to engage a vertical component of the wave energy.

In an embodiment, the system includes a first wheel assembly and a second wheel assembly, each wheel assembly being secured to both the flexible membrane and to the plurality of power generation systems, such that the first and second wheel assemblies are intermediary components of the system between the membrane and the plurality of power generation systems. The first and second wheel assemblies are connected to each other to form a closed loop system with the flexible membrane. In particular, the first outer wheel of the first wheel assembly may be connected to the first outer wheel of the second wheel assembly via an intermediary cable. To form the closed loop, in an embodiment, a plurality of intermediary cables secure the flexible membrane to each of the first and second wheel assemblies, the first wheel assembly to one of the at least two power generation systems, the second wheel assembly to the other of the at least two power generation systems, and the first wheel assembly to the second wheels assembly. Each wheel assembly includes an inner wheel disposed between a first outer wheel and a second outer wheel, with the inner wheel having a diameter smaller than a diameter of each of the outer wheels. In an embodiment, the inner wheel diameter is 4-10 time smaller than the diameter of at least one of the outer wheels. A rotation of the inner wheel rotates each of the outer wheels.

An object of the invention is to provide a scalable system that can capture wave energy from waves of any size, without experiencing terminal mechanical failures and issues typically associated with such systems.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIGS. 4A-4B depict a system for capturing energy from vertical component of wave motion in deep or shallow water, according to certain embodiments of the current invention. FIG. 4A illustrates a deep-water embodiment with large motion-suppressing membrane at the bottom. FIG. 4B illustrates a shallow-water embodiment with anchoring points on the sea floor.

FIG. 5A illustrates the system in use for waves traveling in a first direction, either toward or away from a shore; FIG. 5B illustrates the system in use for waves traveling in a second, opposite direction; and FIG. 5C illustrates a close-up orthogonal view of a set of wheels used to capture wave energy in the embodiments of FIGS. 5A-5B.

DETAILED DESCRIPTION OF THE PREFERRED EMBODIMENT

Figure 1:
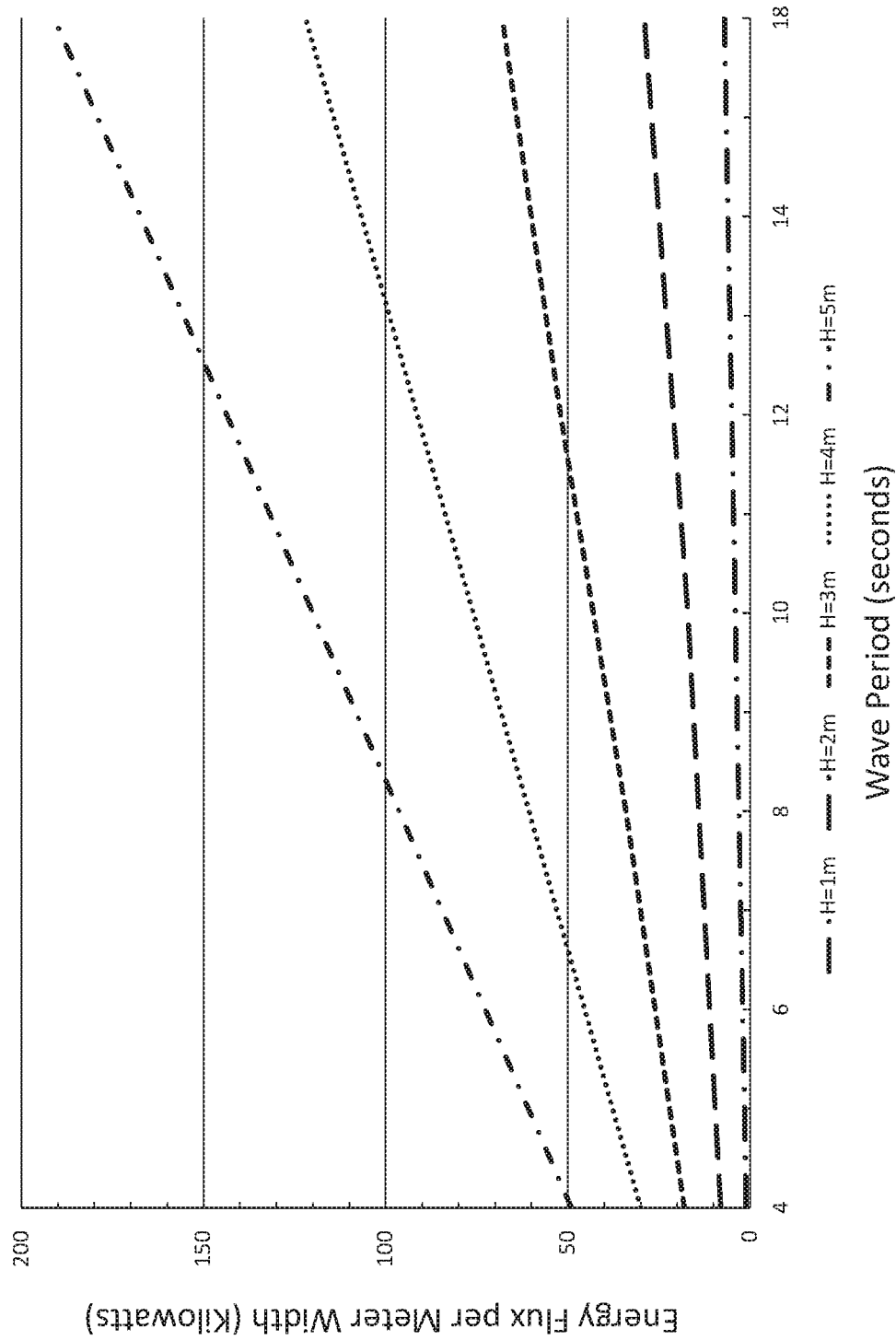
FIG. 1 is a graphical illustration depicting available wave power as a function of wave height and period.
Figure 2:
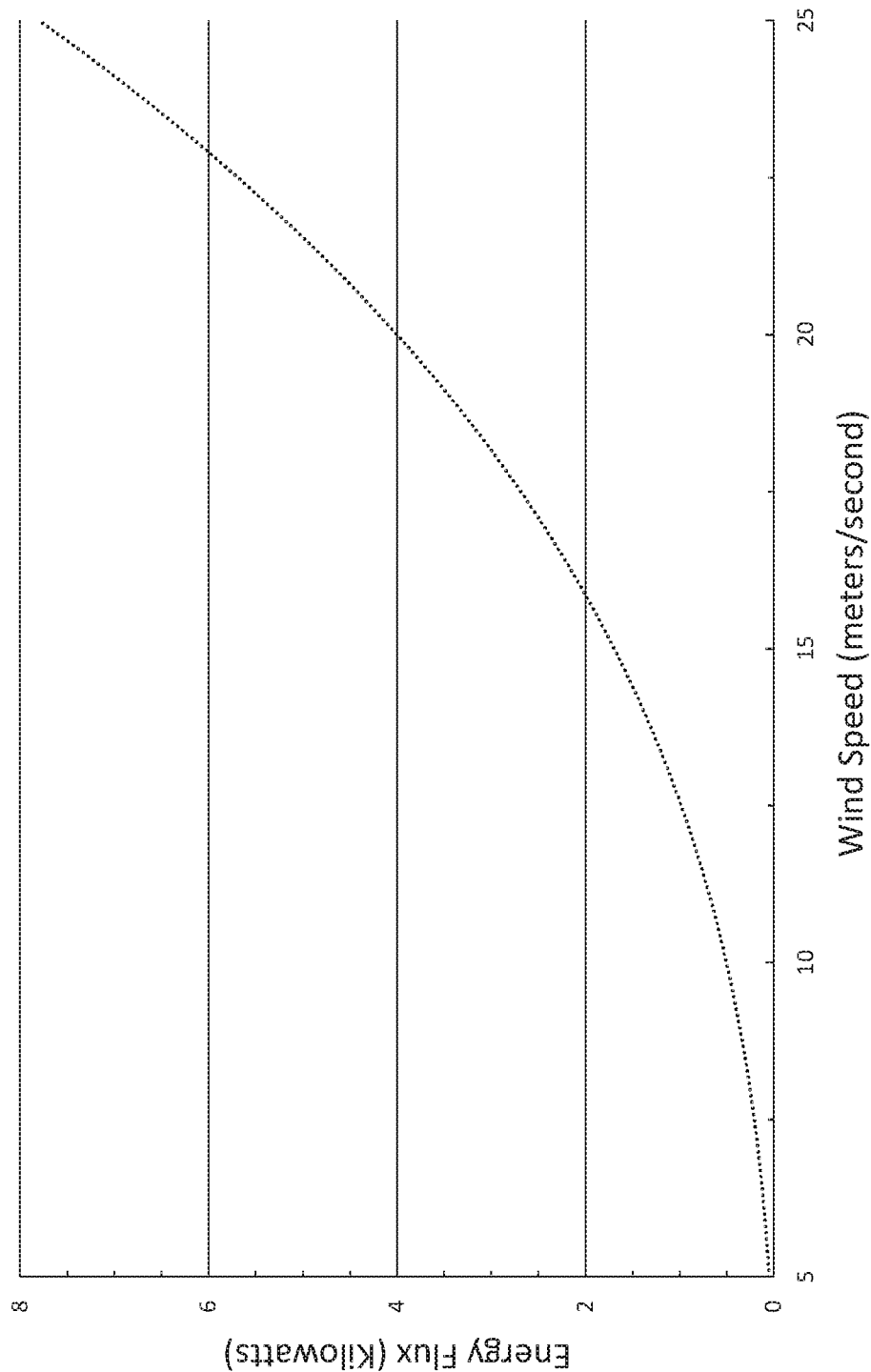
FIG. 2 is a graphical illustration depicting power within a 1 $m^2$ area as a function of wind speed.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

In certain embodiments, the current invention is a WEC device that uses a compliant capture mechanism to enable the collection of wave energy over extensive distances without introducing damaging forces onto the collection structure.

Horizontal Component

In nearshore areas, most of the kinetic energy is moving horizontally. Previous systems have typically accessed nearshore wave energy through rigid mechanical collection devices or turbines that utilize only a small fraction of the total energy, both of which are subject to structural/mechanical problems and bio-fouling. The system discussed herein uses a flexible membrane 10 in a fashion analogous to a piston (see FIG. 3), with the wave motions forcing the energy capture device back and forth. To reduce the vertical movement of the flexible membrane 10 in the embodiment of FIG. 3, the system includes a floating member 20 attached to a top portion of the membrane 10. The floating member 20 is an object that is made of (or filled with) a material that is less dense than water, such that the floating member 20 can translate and maintain the membrane 10 on a surface of a body of water, reducing the vertical movement of the membrane 10.

Energy is collected during the time that the wave pulls the flexible membrane 10 away from the connection to a set of turbines 12 mounted on the sea floor 50 within a body of water 60 and below a surface 70 (shown in greater detail in FIGS. 4A-4B, in particular). The turbines 12 include a collection device designed to collect and store energy captured when the flexible membrane 10 translates within a body of water, as well as a retraction device designed to ensure a secure and tight connection between the flexible membrane 10 and individual turbines 12 as the flexible membrane 10 translates. As such, during the time when the membrane motion is directed toward a collection device, the slack is taken up via a retraction device. Thus, when the wave motion reverses direction, either end of the system is ready to harness energy from the wave motions. The captured energy from the membrane 10 is transferred to the plurality of turbines 12 via a series of intermediary cables 14, with individual cables 14 being secured to one of the turbines 12 and to the membrane 10, thereby tethering the membrane 10 to the turbines 12.

In most cases, energy generated in nearshore applications could be cabled directly back to shore for connection into the on-land power grid. In this case, given the proper design of flexibility and connection points, the wave forces can be distributed over a large area, while limiting the forces on individual elements of the structure. This "wave kite system" (WKS) can harness energy over essentially any desired distance with no increase in the loading on components of the system. In this mode, the structure can be located close to shore and can extend over tens or even hundreds of meters in the along-coast direction. As an example of the energy available to a flexible WKS extending 100 meters in the alongshore direction, the average values in FIG. 1 can simply be multiplied by 100, yielding a value of 1.5 megawatts (MW) for relatively moderate wave conditions.

Vertical Component

An alternative embodiment of the WKS accesses the vertical component of kinetic energy (termed the wave surface system, or WSS) using a flexible mat containing sufficient flotation potential (positive buoyancy) to move with the surface. FIG. 4B shows a version of this device at a depth of about eight (8) meters. As shown in FIG. 4B, the flexible membrane 10 is disposed below the surface 70 of the body of water 60 and above the sea floor 50. The membrane 10 can translate toward the surface 70 and/or toward the sea floor 50, depending on the natural forces acting on the membrane 10. The vertical translation of the membrane 10 captures a portion of the energy required to move the membrane 10, with the captured energy being transferred to and stored within the turbine 12 via an intermediary cable 14. Although only a small section is shown here, it can be extended along the coast to tens or even hundreds of meters along the coast, without increasing forces and moments on the structure. Solid, lightweight plates (with decreasing stiffness to minimize local material stresses) are located at all connection points to distribute the loading. Each point is tethered to an energy collection device similar to those used in the WKS previously described.

The WSS is capable of simple scaling to enable its application for a range of applications, ranging from supplying energy to meet needs in dry continental areas or remote islands, to supplying energy to meet needs in temporary operations, such as military operations, since it is relatively simple to deploy.

A potential application of the WSS would be to generate power for desalinization of sea water in lifeboats or onboard slowly moving vessels. This modification is achieved by using a flexible weighted anchor 16 deployed to a depth of about 10 meters, with the energy collection device on the turbine 12 being located either on the surface 70 of the body of water 60, or or at the base of the system as shown in FIG. 4A. Similarly, the system could also be combined with these wave energy systems in coastal areas around the world, given the increasing need for potable water. Paired with an appropriate desalinization technology, such as reverse osmosis (RO), the scalability of the system could become an effective source of fresh water around the world.

The trade-offs between the WKS and WSS are primarily related to the size and type of waves approaching the coast. The WSS functions better in an omnidirectional sense and the WKS is more robust in extreme sea states, where there is greater potential for energy capture from waves having greater energy. However, the energy generation potential should be comparable in most cases.

Example 1

In certain embodiments, the current invention is a compliant, scalable, rapidly deployable system for capturing or harnessing wave energy in two modes of wave motions (horizontal and vertical components of water-wave energy). The system harnesses energy from wind-waves and swell to produce electricity using a compliant harnessing system that minimizes the potentially massive destructive forces of waves, while also minimizing explosion to corrosion and biofouling. The system enables the wave collection device to extend effectively over significantly larger collection areas than rigid, non-compliant systems and is scalable to enable collection of energy at very small scales (low wave conditions that can even be hand deployed).

Figure 3:
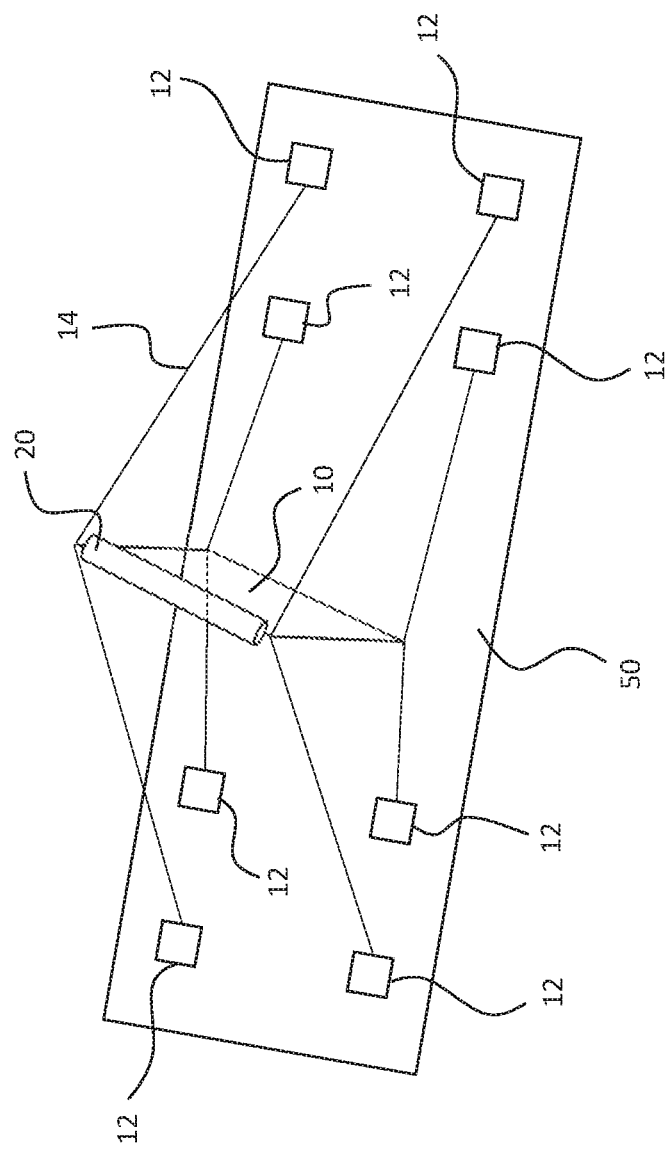
FIG. 3 depicts a system for capturing energy from horizontal components of wave motions in nearshore areas, according to an embodiment of the current invention. Energy may be connected to directly into the onshore power grid in this mode of operation, but could alternatively be connected to meet any alternative port/coastal energy mode/requirements.

FIG. 3 depicts an embodiment of the system for harnessing horizontal components of wave energy. The system includes a flexible membrane 10 that captures wave energy in a fashion analogous to a piston in engines. The membrane 10 (which may be referred to as a "kite" as result of the similarities in movement between the membrane 10 described herein and traditional kites) system is formed of a strong (optionally reinforced) fabric, resistant to tearing, and has a skeleton of flexible tubing to ensure that the system retains its approximate overall form. The kite 10 has a floating member 20 at the top, keeping top of the membrane 10 at or near the surface 70 of the body of water 60. The membrane 10 is connected by a series of intermediary cables 14 connected to a plurality of turbines 12, each including self-reeling mechanisms, positioned on the sea floor 50. The self-reeling mechanisms remove line slack during the portion of the wave cycle in which the motion is directed toward a generator system, at which time the energy is harnessed by the generators on the opposite side. The generators are also components of the plurality of turbines 12, such that each of the plurality of turbines 12 can function as a generator or a self-reeling mechanism depending on the movement of the membrane 10. As such, the system is highly efficient, in that the same anchored points (i.e., the plurality of turbines 12) are used whether the membrane 10 is translating toward or away from an individual turbine 10. The number and placement of these connection points can be designed to keep the forces on any local area within its design limits.

Still referring to FIG. 3, the generators are contained within the plurality of turbines 12, which may be referred to as bottom-anchored containers that enclose a power generation system, including three main components: (1) a self-reeling line handling component (for line slack removal), (2) a reel inside the line that spins a shaft when waves pull the line away from the anchor, and (3) a gear connected to the shaft that turns the rotator within the generator. The reel may be the only component exposed to sea water, with the generator system housed within a dry container, protected from the sea water and debris. Although the energy-conversion containers are shown on the bottom in FIGS. 4A-4B, they could be located at the top, which could be a significant advantage in some applications, particularly small-scale energy harvesting.

Example 2

FIGS. 4A-4B depict embodiments of the system harnessing energy from vertical motions. In deep water, the embodiment of FIG. 4A could be used, where the bottom motion suppressor includes a flat plate that minimizes vertical motions at the bottom of the system, while the top (i.e., the membrane 10) is free to move up and down with respect to the water surface 70. In shallow water, the embodiment of FIG. 4B could be used, where the plurality of turbines 12 include simple weights (anchors) deployed on the sea floor 50. The weighted turbines 12 can be utilized to achieve the same motion differential that drives the generators.

Example 3

Figure 5A:
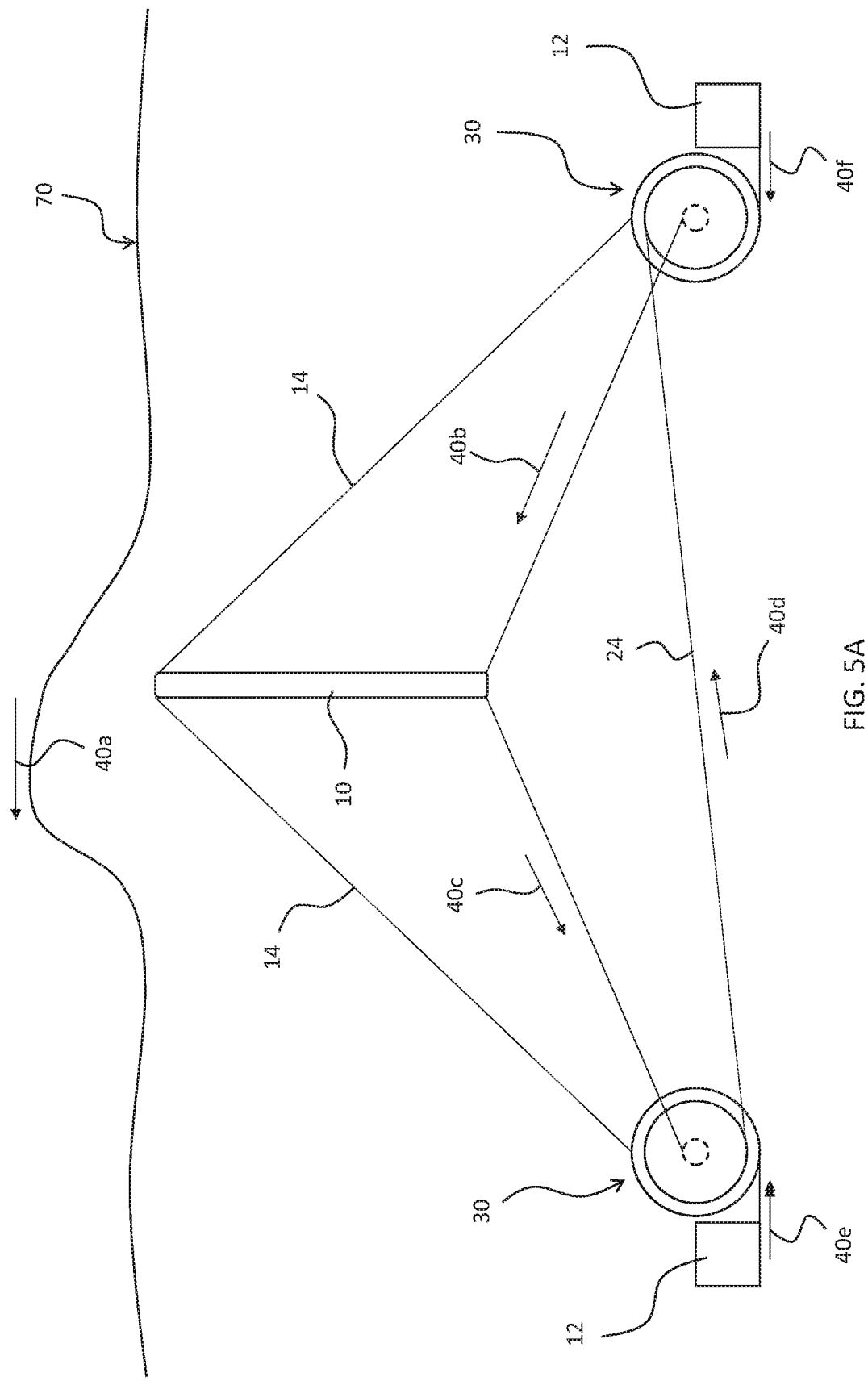
FIGS. 5A-5C depict a system for capturing energy from horizontal components of wave motions in nearshore areas, according to an embodiment of the current invention.
Figure 5B:
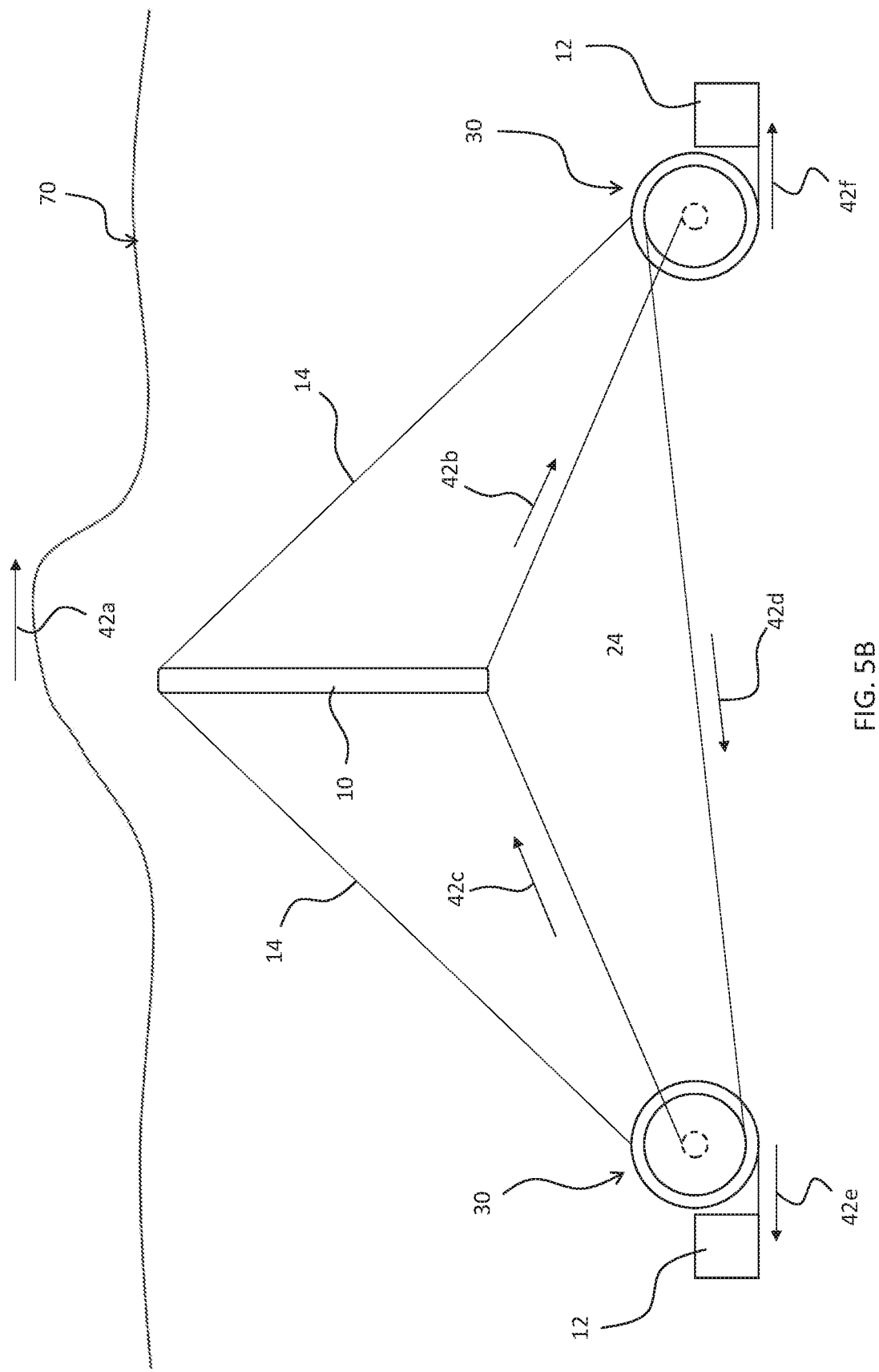
Figure 5C:
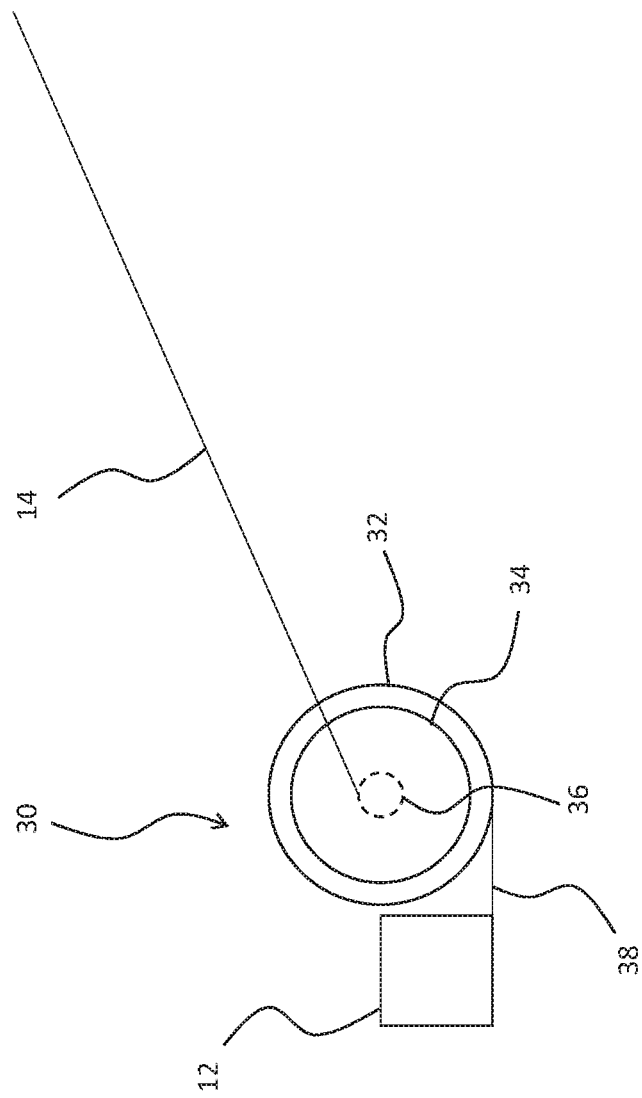

FIGS. 5A-5C illustrate an alternative embodiment of the present system used, in particular, to capture the horizontal component associated with wind wave energy, particularly used in shallow waters. The system captures energy from wave velocities moving toward and away from the shore, such as by progressive water waves in relatively shallow water (in which the ratio of wave length to depth is around 0.3). In such shallow waters, the motion of water is primarily in the horizontal direction, due to the relatively small depth of the water close to the shore. In such shallow waters, it is desirable to capture the energy in a horizontal direction, which can lead to greater energy capture than the vertical direction. As such, the system in FIGS. 5A-5C are deployed in depths of approximately five (5) meters between the sea floor 50 and the surface 70, with the system disposed approximately two (2) meters above the sea floor 50; however, the deployment of the system can be optimized, depending on the particular depth of water and other surrounding factors during an implementation of the system.

As shown in FIGS. 5A-5B, in particular, the system includes a flexible membrane 10 that is similar to the membrane shown in FIGS. 3-4B and discussed in detail above. The membrane 10 is designed to translate in a horizontal direction toward and away from a shore, depending on the wave direction. FIG. 5A shows the motion of the system with a wave traveling in a first direction, such as toward a shore; similarly, FIG. 5B shows the motion of the system with a wave traveling in a second direction, such as away from a shore. Similar to the system discussed above and shown in FIGS. 3-4B, the system of FIGS. 5A-5B can capture energy regardless of the direction of wind wave energy. Moreover, the system is designed to translate in an orbital motion in accordance with the direction of waves.

The membrane 10 is connected to at least a set of assemblies 30, with each assembly 30 including a plurality of wheels. The plurality of wheels will be discussed in greater detail below during the discussion of FIG. 5C. The membrane 10 and the assemblies 30 are secured to each other via a plurality of intermediary cables 14, similar to the system discussed above. The membrane 10 is designed to translate in response to the orbital velocities of waves traveling toward and away from a shore, with the plurality of intermediary cables 14 tethering the membrane to the assemblies 30 to capture energy from the orbital motion of the waves. While FIGS. 5A-5B depict the membrane 10 as an elongated rectangular shape, it is appreciated that the membrane 10 can be any shape that can effectively capture energy from waves in shallow bodies of water. For example, in an embodiment, the membrane 10 may be between 2-5 meters in width and 3-4 meters in height to minimize the potentially-destructive forces of large waves, while allowing multiple membranes 10 to be deployed along a line in approximately the same depth. Similar to the system above, the membrane 10 may include a floating member 20 at the top to maintain a vertical orientation of the membrane 10. The floating member 20 may be of sufficient density to float at the surface 70 of the body of water 60; alternatively, as shown in FIGS. 5A-5B, the floating member 20 may be of such a density that the membrane 10 is disposed beneath the surface 70 but above the sea floor 50.

As discussed above, in use, the membrane 10 is designed to translate in an orbital motion with the orbital motion of waves flowing toward and away from a shore, particularly in shallow waters. To capture the energy of the waves, the membrane 10 is connected to the assemblies 30, which are shown in greater detail in FIG. 5C. Each assembly 30 includes an inner wheel 36 and outer wheels 32, 34. The inner wheel 36 has an associated diameter that is smaller than the diameters of each of the outer wheels 32, 34. In an embodiment, the diameter of the outer wheel 32 (which is connected to the turbine 12 housing a generator) is 4-10 times larger than the diameter of the inner wheel 36, such that the revolutions per minute of the generator inside the turbine 12.

In addition, the inner wheel 36 includes an outer surface having a base and two opposing sidewalls extending from the base, such that one of the intermediary cables 14 can rest on the base of the inner wheel 36 and be retained by the sidewalls, preventing the cable from slipping off of the inner wheel 36. The outer wheels 32 and 34 have similar components, including the base and the sidewalls, such that the intermediary cables 14 connected to the outer wheels 32 and 34 can be retained by respective wheels. These beveled sidewalls function to create a smooth motion throughout the system, unlike traditional gears that can jam in the event of a misalignment.

In addition, the orientation of the wheels is such that the inner wheel 36 is central to the outer wheels 32 and 34, with the outer wheels 32 and 34 flanking opposing sides of the inner wheel 36. The inner wheel 36 is secured to each of the outer wheels 32 and 34. As such, a rotation of the inner wheel 36 can rotate the outer wheels 32 and 34, thereby driving the system during the capturing of wave energy. Each of the wheels may be wrapped in layers of material to protect the wheels from environmental conditions, as well as from potential obstructions as the wheels are translated as a result of orbital wave motions.

The system forms a closed loop to minimize energy loss. As such, the outer wheel 34 of each assembly 30 are connected by an intermediary line 14 directly between the outer wheels 34. In addition, the inner wheel 36 of each assembly is connected to the membrane 10, and the outer wheels 32 are also connected to the membrane 10, each of which is connected via an intermediary line 14. The result of the connections is a closed loops system, such that a horizontal translation of the membrane 10 translates the intermediary lines 14 throughout the system to minimize any slack in the lines, making the transfer of energy highly efficient. The system can also include an elastomeric section in the intermediary lines 14 to further reduce the chance of the development of slack in the system.

As shown in FIG. 5A, a wave motion in the direction denoted by reference numeral 40a would translate the membrane 10 in the same direction. When this wave motion and translation occurs, the intermediary lines 14 in turn translate during the energy capture performed via the membrane 10. As shown in FIG. 5A, the intermediary line 14 between the right assembly 30 and the membrane 10 translates in the direction denoted by reference numeral 40b; similarly, the intermediary line 14 between the membrane 10 and the left assembly 30 translates in the direction denoted by reference numeral 40c. These translations drive the rotation of the inner wheels 36 on each of the assemblies 30. Since the inner wheels 36 are secured to the outer wheels 32 and 34, the rotation of the inner wheels 36 in turn rotates the outer wheels 34 of each assembly 30 via the intermediary line 14, which translates in the direction denoted by reference numeral 40d, thereby preventing slack from developing in the system. Similarly, the rotation of inner wheels 36 in turn rotates the outer wheels 32 of each assembly 30, which can then transfer energy to the turbines 12 housing generators for the storage of a portion of the energy captured by the membrane 10. The turbines 12 can be rotated in either direction, depending on the motion of the system as a result of the translation of membrane 10 by orbital waves. In FIG. 5A, the rotation of the turbines 12 is denoted by reference numerals 40e and 40f.

FIG. 5B is a representation of the system during a wave motion in the direction denoted by reference numeral 42a, which is opposite from the wave motion 40a in FIG. 5A. Accordingly, the directions of motion in the system as shown in FIG. 5B are opposite those shown in FIG. 5A. Specifically, the intermediary line 14 between the left assembly 30 and the membrane 10 translates in the direction denoted by reference numeral 42c; similarly, the intermediary line 14 between the membrane 10 and the right assembly 30 translates in the direction denoted by reference numeral 42b. The outer wheels 34 of each assembly rotate and translate the intermediary line 14 in the direction denoted by reference numeral 42d. Finally, the rotation of turbines 12 is denoted by reference numerals 42e and 42f, and occurs in a similar manner as discussed in the description of FIG. 5A above.

Advantages

The systems shown in FIGS. 3, 4A-4B, and 5A-5C are capable of handling extreme wave conditions during storms, due to its compliant fabric construction of the system component (i.e., the membrane 10) exposed to the wave forces and the self-reeling mechanism. If desired, in very extreme storms, the embodiment shown in FIG. 3 system could be lowered toward the sea floor 50 or the depth of the kite 10 component raised, to reduce forces acting on it. If the kite 10 section is ever damaged or needs to be replaced as part of its maintenance, the buoyant floating member 20 disposed at the top of the kite 10 can be automatically release and ballasted to allow its safe disconnect from the bottom connections.

The system is scalable depending on the region of deployment and specific energy needs, using any number of connection required by design considerations. The vertical-motion-harnessing may be easier to deploy and also to scale for low-energy requirements, such as by small vessels to create needed electrical power when anchored or potentially to power de-salinization systems in some circumstances, such as lifeboat deployments or ships without a source of power following a mechanical problem or storm.

Another advantage of the system and method discussed herein to access wave energy is its capability to achieve potentially very large deployment sizes. A large buoy only collects energy from a 15-meter width. The current system can be built to collect energy over tens or even hundreds of meters, which would make the energy collection rate much larger than that of offshore buoys.

Additionally, the amount of energy in wind waves coming into coastal margins of the United States is enormous, as can be seen in Table 1.

TABLE 1

Total available wave energy resource breakdown by region.
This was a study performed by the Electric Power Research
Institute (EPRI) under the title, Mapping and Assessment
of the United States Ocean Wave Energy Resource

| Coastal Region | Total Available Wave Energy |
| --- | --- |
| West Coast of the United States | 590 TWh/yr |
| East Coast of the United States | 240 TWh/yr |
| Gulf of Mexico | 80 TWh/yr |
| Hawaii | 130 TWh/yr |
| Puerto Rico | 30 TWh/yr |

Unlike conventional systems that are often intended solely for offshore deployment, the current system can be deployed effectively in either shallow water or deep water. Deployments in nearshore (shallow) areas can connect directly into existing power grids and avoid the need for expensive energy storage, transport to shore, and conversion. As such, the systems discussed herein improve upon the efficiencies of existing wind wave capture systems, in part by reducing the energy consumption typically associated with such systems.

Through testing, it is anticipated that wave energy outputs will have a cost that is lower than wind energy and much lower than solar systems. Also, due to the longer persistence of wave conditions, it should provide a more consistent energy source than wind or solar sources. Unlike conventional devices for the generation of energy from waves that are exposed to corrosion and biofouling and have experienced major problems in large waves, the current system is specifically designed to overcome these issues.

It is an object of the current invention to provide green energy from waves throughout the year, though seasonal variations are expected. The system can be used to power coastal communities with constant green energy. On islands, for example, rather than importing fossil fuels to power generators, power plants can use these systems to harness clean wave energy which is always provided by nature. Another potential application of the system is a potential pairing of this energy harvesting device with desalinization systems to meet the growing demands for potable water in many areas of the world.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A wave energy harnessing and conversion system comprising:
   a flexible membrane adapted to be disposed within an amount of water, the flexible membrane including a skeleton of flexible tubing to ensure that the flexible membrane retains its approximate overall form;
   a plurality of power generation systems disposed within the amount of water, each of the plurality of power generations systems secured to the flexible membrane via an intermediary cable, such that a first end of each intermediary cable is secured to one of the plurality of power generation systems, and a second end of each intermediary cable is secured to the flexible membrane, each of the plurality of power generation systems including:
      a self-reeling line handling component that removes any slack of a corresponding line during a portion of the wave cycle in which motion is directed toward a corresponding power generation system;
      a reel that spins a shaft when a wave pulls the corresponding lines to or from the corresponding power generation system; and
      a gear coupled to the shaft that turns a rotator within a generator, thus harnessing wave energy.

2. The wave energy harnessing and conversion system of claim 1, wherein the flexible membrane is vertically disposed to engage a horizontal component of the wave energy.

3. The wave energy harnessing and conversion system of claim 2, wherein the plurality of power generation systems further comprises a first set of power generation system disposed on a first side of the flexible membrane, and a second set of power generation systems disposed on a second side of the flexible membrane.

4. The energy harnessing and conversion system of claim 3, wherein a horizontal translation of the flexible membrane in a direction toward the first set of power generation systems actuates the self-reeling line handling components of the first set of power generation systems.

5. The energy harnessing and conversion system of claim 1, wherein the flexible membrane is horizontally disposed to engage a vertical component of the wave energy.

6. The energy harnessing and conversion system of claim 1, wherein the flexible membrane is formed of a strong fabric that is resistant to tearing.

7. The energy harnessing and conversion system of claim 1, further comprising a flotation component coupled to at least one edge of the flexible membrane, the floatation component having an associated density less than a density of water, such that the flotation component is adapted to be disposed at or near the surface of the water.

8. The energy harnessing and conversion system of claim 1, further comprising a first wheel assembly and a second wheel assembly, each of the first and second wheel assemblies secured to the flexible membrane and to the plurality of power generation systems, such that the first and second wheel assemblies are intermediary components of the system between the membrane and the plurality of power generation systems.

9. The energy harnessing and conversion system of claim 8, wherein the first and second wheel assemblies are connected to each other to form a closed loop system with the flexible membrane.

10. The energy harnessing and conversion system of claim 8, wherein each of the first and second wheel assemblies further comprises an inner wheel disposed between a first outer wheel and a second outer wheel, the inner wheel having a diameter smaller than a diameter of each of the outer wheels, wherein a rotation of the inner wheel rotates each of the outer wheels.

11. The energy harnessing and conversion system of claim 10, wherein the first outer wheel of the first wheel assembly is connected to the first outer wheel of the second wheel assembly via an intermediary cable.

12. The energy harnessing and conversion system of claim 10, wherein the diameter of at least one of the first outer wheel and the second outer wheel is 4-10 times greater than the diameter of the inner wheel, thereby increasing a revolution per minute of at least one of the plurality of power generation systems.

13. A wave energy harnessing and conversion system, comprising:
   a flexible membrane adapted to be disposed within an amount of water, the flexible membrane including a skeleton of flexible tubing to ensure that the flexible membrane retains its approximate overall form, the flexible membrane being vertically disposed to engage a horizontal component of the wave energy;
   a flotation component coupled to at least a top edge of the flexible membrane, the floatation component having an associated density less than a density of water, such that the flotation component is adapted to be disposed at or near the surface of the water;
   a plurality of intermediary cables each having one end secured to the flexible membrane or flotation component;
   a plurality of power generation systems positioned on a sea floor in proximity to the flexible membrane, wherein each of the plurality of intermediary cables is connected on its opposite end to one of the power generation systems,
   wherein each power generation system includes:
      a self-reeling line handling component that removes any slack of a corresponding line during a portion of the wave cycle in which motion is directed toward a corresponding power generation system;
      a reel that spins a shaft when a wave pulls the corresponding lines to or from the corresponding power generation system; and
      a gear coupled to the shaft that turns a rotator within a generator, thus harnessing energy;
   wherein energy is collected when the wave pulls the flexible membrane to one or more corresponding power generation systems,
   whereby each power generation system is prepared to harness energy from the wave motions.

14. The wave energy harnessing and conversion system of claim 13, wherein the flexible membrane is formed of a strong fabric that is resistant to tearing.

15. The wave energy harnessing and conversion system of claim 13, wherein the plurality of power generation systems further comprises a first set of power generation system disposed on a first side of the flexible membrane, and a second set of power generation systems disposed on a second side of the flexible membrane.

16. The wave energy harnessing and conversion system of claim 15, wherein a horizontal translation of the flexible membrane in a direction toward the first set of power generation systems actuates the self-reeling line handling components of the first set of power generation systems.

17. The wave energy harnessing and conversion system of claim 13, further comprising a first wheel assembly and a second wheel assembly, each of the first and second wheel assemblies secured to the flexible membrane and to the plurality of power generation systems, such that the first and second wheel assemblies are intermediary components of the system between the membrane and the plurality of power generation systems,
   wherein the first and second wheel assemblies are connected to each other to form a closed loop system with the flexible membrane.

18. The wave energy harnessing and conversion system of claim 17, wherein each of the first and second wheel assemblies further comprises an inner wheel disposed between a first outer wheel and a second outer wheel, the inner wheel having a diameter smaller than a diameter of each of the outer wheels, wherein a rotation of the inner wheel rotates each of the outer wheels.

19. A wave energy harnessing and conversion system comprising:
   a flexible membrane adapted to be disposed within an amount of water, the flexible membrane being vertically disposed to engage a horizontal component of the wave energy;
   at least two power generation systems positioned on a sea floor in proximity to the flexible membrane, with the at least two power generation systems being disposed on opposing sides of the flexible membrane,
   wherein each power generation system includes:
      a self-reeling line handling component that removes any slack of a corresponding line during a portion of the wave cycle in which motion is directed toward a corresponding power generation system;
      a reel that spins a shaft when a wave pulls the corresponding lines to or from the corresponding power generation system; and
      a gear coupled to the shaft that turns a rotator within a generator, thus harnessing energy;
   a first wheel assembly disposed proximate to one of the at least two power generation systems and a second wheel assembly disposed proximate to the other of the at least two power generation systems, each of the first and second wheel assemblies secured to the flexible membrane and to the respective at least two power generation systems, such that the first and second wheel assemblies are intermediary components of the system between the membrane and the at least two power generation systems,
   wherein each of the first and second wheel assemblies includes:
      an inner wheel disposed between and secured to a first outer wheel and a second outer wheel, the inner wheel having a diameter smaller than a diameter of each of the outer wheels, such that a rotation of the inner wheel rotates each of the outer wheels; and
   a plurality of intermediary cables forming a closed loop for the wave energy harnessing and conversion system, the plurality of intermediary cables securing the flexible membrane to each of the first and second wheel assemblies, the first wheel assembly to one of the at least two power generation systems, the second wheel assembly to the other of the at least two power generation systems, and the first wheel assembly to the second wheel assembly,
   wherein energy is collected when the wave pulls the flexible membrane to one or more corresponding power generation systems,
   whereby each power generation system is prepared to harness energy from the wave motions.

* * * * *